US007712200B2

(12) United States Patent
Squires et al.

(10) Patent No.: US 7,712,200 B2
(45) Date of Patent: May 11, 2010

(54) METHOD FOR RESTRAINING A PRISONER

(76) Inventors: Keith D. Squires, P.O. Box 497, Morgan, UT (US) 84050; Omar L. Issa, 200 W. Center, Venice, UT (US) 84701

(*) Notice: Subject to any disclaimer, the term of this patent is extended or adjusted under 35 U.S.C. 154(b) by 301 days.

(21) Appl. No.: 11/396,330

(22) Filed: Mar. 31, 2006

(65) Prior Publication Data

US 2006/0225943 A1 Oct. 12, 2006

Related U.S. Application Data

(63) Continuation of application No. 10/947,999, filed on Sep. 23, 2004, now abandoned.

(51) Int. Cl.
*B23P 11/00* (2006.01)
*B60R 21/00* (2006.01)

(52) U.S. Cl. .......................... 29/428; 29/469; 297/466; 128/879; 70/16

(58) Field of Classification Search .................. 29/428, 29/469; 297/466; 280/807; 128/869, 876, 128/878, 879; 70/16
See application file for complete search history.

(56) References Cited

U.S. PATENT DOCUMENTS

| | | | | | |
|---|---|---|---|---|---|
| 1,823,697 | A | * | 9/1931 | Nenstiehl | 70/16 |
| 2,150,368 | A | * | 3/1939 | Fitzgerald et al. | 70/16 |
| 2,645,922 | A | * | 7/1953 | Martin | 70/16 |
| 2,830,655 | A | | 4/1958 | Lalande | |
| 2,949,761 | A | * | 8/1960 | Mitchell et al. | 70/16 |
| 3,007,331 | A | * | 11/1961 | Irwin | 70/57 |
| 3,281,818 | A | | 10/1966 | Morgan et al. | |
| 3,321,247 | A | | 5/1967 | Dillender | |
| 3,992,040 | A | | 11/1976 | Gannac | |
| 4,173,974 | A | * | 11/1979 | Belliveau | 70/16 |
| 4,245,856 | A | * | 1/1981 | Ziv | 280/802 |
| 4,384,735 | A | * | 5/1983 | Maeda et al. | 280/801.1 |
| 4,461,493 | A | | 7/1984 | Doty | |
| 4,467,493 | A | | 8/1984 | Buchtel | |
| 4,506,912 | A | * | 3/1985 | Ahad | 280/803 |
| 4,621,835 | A | * | 11/1986 | Edwards | 280/803 |
| 4,728,553 | A | * | 3/1988 | Daniels | 428/100 |
| 4,789,183 | A | * | 12/1988 | Wolfer | 280/801.1 |
| 4,925,246 | A | * | 5/1990 | Corcoran | 297/466 |
| 4,949,679 | A | * | 8/1990 | Wolfer | 70/16 |
| 4,995,672 | A | | 2/1991 | Corcoran | |
| 5,050,906 | A | * | 9/1991 | Kneip | 280/805 |
| 5,261,728 | A | * | 11/1993 | Carmichael | 297/482 |
| 5,345,947 | A | * | 9/1994 | Fisher | 128/878 |
| 5,544,363 | A | | 8/1996 | McCue et al. | |
| 5,546,962 | A | * | 8/1996 | Power | 128/869 |

(Continued)

FOREIGN PATENT DOCUMENTS

EP 364303 A2 * 4/1990

*Primary Examiner*—Essama Omgba
(74) *Attorney, Agent, or Firm*—Bateman IP Law Group

(57) ABSTRACT

A prisoner seat security device includes a retractable strap which hooks or clasps onto a prisoner, preferably by a restraint device on the prisoner, such as hand-cuffs. As the prison seats in the seat, the strap retracts. The officer can then lock the retraction mechanism so that the strap will not extend and the prisoner is held in place. When it is desired for the prisoner to get out of the chair, the lock is released, allowing the prisoner to stand the strap to be disconnected.

26 Claims, 4 Drawing Sheets

U.S. PATENT DOCUMENTS

Figure 1:
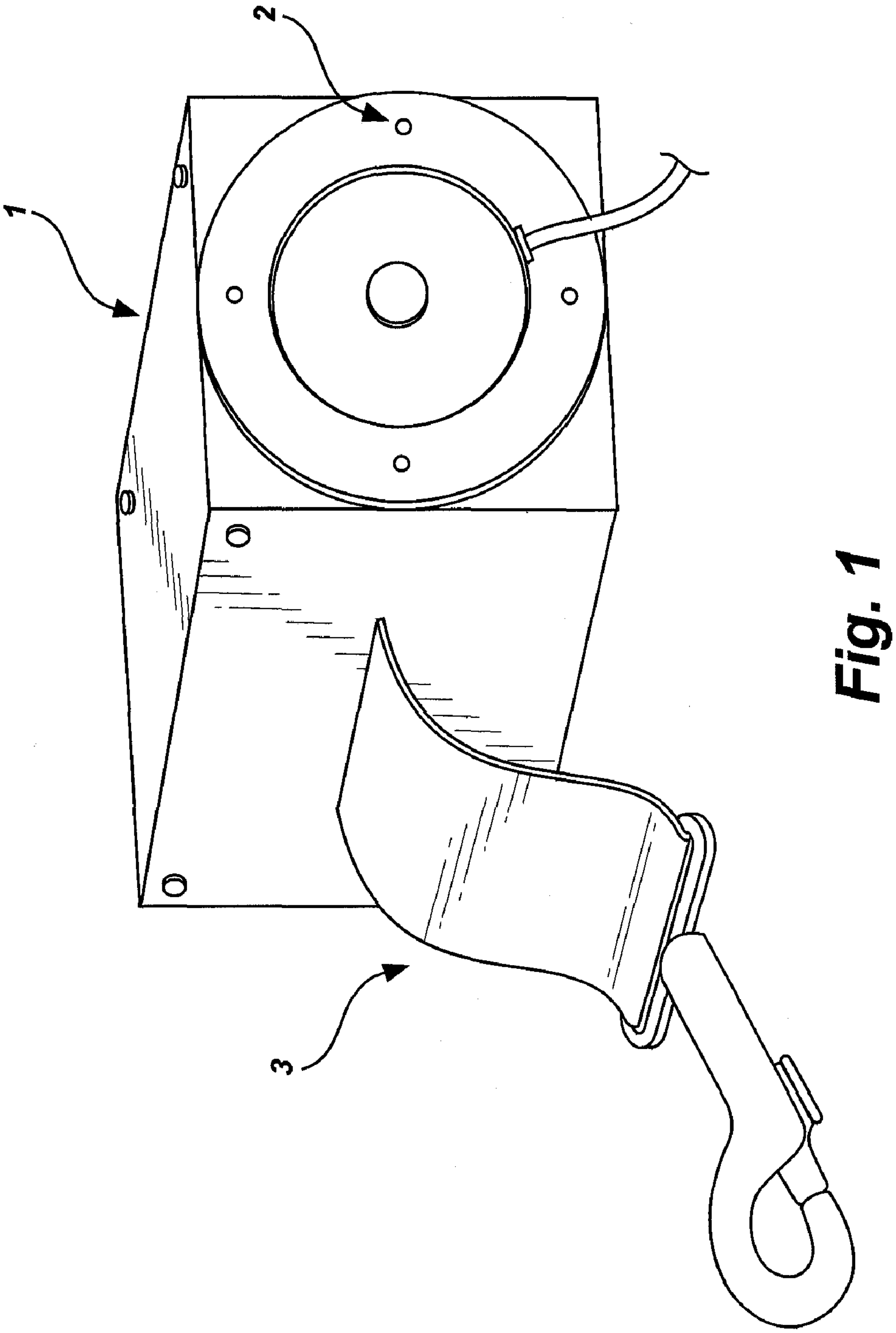

| | | | | | |
|---|---|---|---|---|---|
| 5,581,853 | A * | 12/1996 | Miller et al. | 24/302 |
| 5,680,781 | A * | 10/1997 | Bonds et al. | 70/16 |
| 5,749,130 | A | 5/1998 | Bilyeu et al. | |
| 6,026,661 | A | 2/2000 | Spiropoulos | |
| 6,138,677 | A * | 10/2000 | DeVane | 128/869 |
| 6,360,747 | B1 * | 3/2002 | Velarde et al. | 128/869 |
| 6,368,262 | B1 * | 4/2002 | Willoughby et al. | 482/148 |
| 6,406,230 | B1 | 6/2002 | Mason et al. | |
| 6,718,894 | B2 * | 4/2004 | Whaley | 112/470.27 |
| 6,725,865 | B2 * | 4/2004 | Chapman | 128/869 |
| 6,874,506 | B2 | 4/2005 | Chapman | |
| 7,140,571 | B2 * | 11/2006 | Hishon et al. | 242/390.8 |
| 7,210,317 | B2 * | 5/2007 | Beane et al. | 70/16 |
| 7,340,926 | B2 * | 3/2008 | Kim et al. | 70/16 |
| 2007/0046014 | A1 * | 3/2007 | Glover et al. | 280/805 |
| 2007/0063505 | A1 * | 3/2007 | Eusebi | 280/801.1 |
| 2007/0145087 | A1 * | 6/2007 | Mikesell et al. | 224/269 |
| 2007/0181079 | A1 * | 8/2007 | Fong | 119/786 |
| 2008/0072844 | A1 * | 3/2008 | Konigsberg | 119/770 |
| 2008/0168603 | A1 * | 7/2008 | Ayette et al. | 5/628 |
| 2008/0314336 | A1 * | 12/2008 | Church et al. | 119/771 |

* cited by examiner

METHOD FOR RESTRAINING A PRISONER

RELATED APPLICATIONS

The present application is a continuation of U.S. patent application Ser. No. 10/947,999, filed Sep. 23, 2004 now abandoned.

BACKGROUND OF THE INVENTION RELATED APPLICATIONS

Law enforcement, correction security and military personnel transport handcuffed or otherwise fettered prisoners in various vehicles from one location to another. Traditionally, a police officer arrests a suspect and places him/her into handcuffs. The prisoner is then placed in the police vehicle, which is often equipped with an after market cage that prevents the suspect from exiting the back seat compartment. The cage requires hard installation to the vehicle and prevents the rear passenger compartment from being utilized for other purposes. Many officers and departments forego the use of a cage and place the handcuffed prisoner in the front passenger seat and then only use a seatbelt to restrain the prisoner. This practice can allow prisoners to move around freely enough to unlatch the seatbelt, unlock and open the vehicle's door to escape, and in some circumstances to move the handcuffs from behind the back to the front, which facilitates a possible assault on the officer or unlawful operation of the police vehicle.

SUMMARY OF THE INVENTION

The preferred application of this invention incorporates a mounting apparatus that hangs over the back of a front passenger side vehicle seat and is fastened to the seat. Towards the bottom of the mounting apparatus is attached a housing which contains a spring-loaded spool, wrapped with a nylon strap that can be rendered locked in place by means of an electronic braking device which is operated by a remote switch.

The nylon strap exits the housing and travels through the vehicle seat to the front. The spool is in its inactive mode, which allows the strap to be extracted freely. The police officer (operator) walks a handcuffed or similarly fettered prisoner to the front passenger door of his police vehicle. He then attaches the retractable nylon strap to the chain between the handcuffs by means of a clasp. The suspect then sits down into the seat as the nylon strap self retracts into its housing through the seat. When the suspect is seated against the seatback, the operator activates a remote-controlled switch which causes a 12-volt current to engage the spool's braking mechanism and prevent the nylon strap from again being extracted. This action holds the prisoner's body and hands in place against the seat and prevents him/her from being able to move sufficiently enough to unlatch the seatbelt, unlock and open the door, or move their handcuffs to the front. This prevents their ability to assault the officer or operate the police vehicle.

By having the prisoner secured in such a manner, the police officer can then go about his other necessary duties which may include: dealing with other suspects, searching or inventorying a vehicle, talking with victims and witnesses. When a lone officer has more than one suspect, this device allows him the ability to secure multiple prisoners in his vehicle while preventing their ability to move sufficiently to physically interact with each other.

After concluding his on-scene duties, the officer is able to transport the prisoner from the scene to the police station or correctional facility for processing, knowing that the prisoner is secure and unable to make hazardous movements. After transport, the officer opens the prisoner's door and releases the electronic brake by means of the remote-controlled switch. The prisoner is directed to stand up and exit out of the vehicle. The officer can then unhook the nylon strap and escort the prisoner into the facility.

The prime innovation of this invention is that it provides a retractable and locking device specifically designed to secure a handcuffed prisoner in place against a vehicle seat. This action prevents the prisoner from being able to move his hands and body sufficiently enough to release a seatbelt latch or unlock and open a door. This further prevents the prisoner from being able to move the handcuffs from back to front. The invention requires no major modification to the vehicle and it is relatively portable allowing for it to be removed and reinstalled into another vehicle.

Its design utilizes the installation behind the seat to combat the force that a prisoner could possibly exert in order to defeat the locked secure position of the nylon strap. As the prisoner pulls against the strap, it is additionally being reinforced by its position behind the seat.

Some additional advantages to the use of this invention are:

It causes minimal damage to a vehicle as a result of installation, and thus increases the vehicle resale value.

It can be easily moved from one vehicle and reinstalled into another.

It has a low profile design which allows the seat to still be utilized for non-prisoner passengers.

The low profile design and simplicity of use are less likely to create anxiety by the prisoner.

It provides an alternative to the use of a police cage.

In cases of emergency the transporting officer can release the prisoner by activating the remote switch. Additionally, the nylon strap can be cut with a knife or scissors to facilitate a quick release.

The brake for the spool containing the nylon strap is in a locked position when a 12-volt current is supplied to it by activation of the officer's remote-controlled switch. Should that current from the vehicle's battery be disrupted due to a collision, the brake disengages and the strap may be extracted allowing for the prisoner to exit the vehicle.

The device is used in conjunction with the use of the vehicle's seatbelts. It does not interfere with the normal operation of a vehicle's seatbelt.

The method of restraining a person in a vehicle seat would comprise selecting a strap or tether connected to a retraction mechanism, the strap or tether being attached on one side of the seat, extending the strap or tether and attaching the strap or tether to the person on the opposite side of the seat, retracting the strap or tether as the person sits in the seat, locking the strap or tether in a retracted position; and maintaining the strap or tether in a retracted position until the person is authorized to get out of the vehicle. The method could further comprise extending the strap or tether between an upper portion and a lower portion of the vehicle seat.

THE DRAWINGS

A preferred embodiment of the invention is illustrated in the accompanying drawings in which:

FIG. 1, is a view of the retractable restraint shown without a mounting system.

Figure 2:
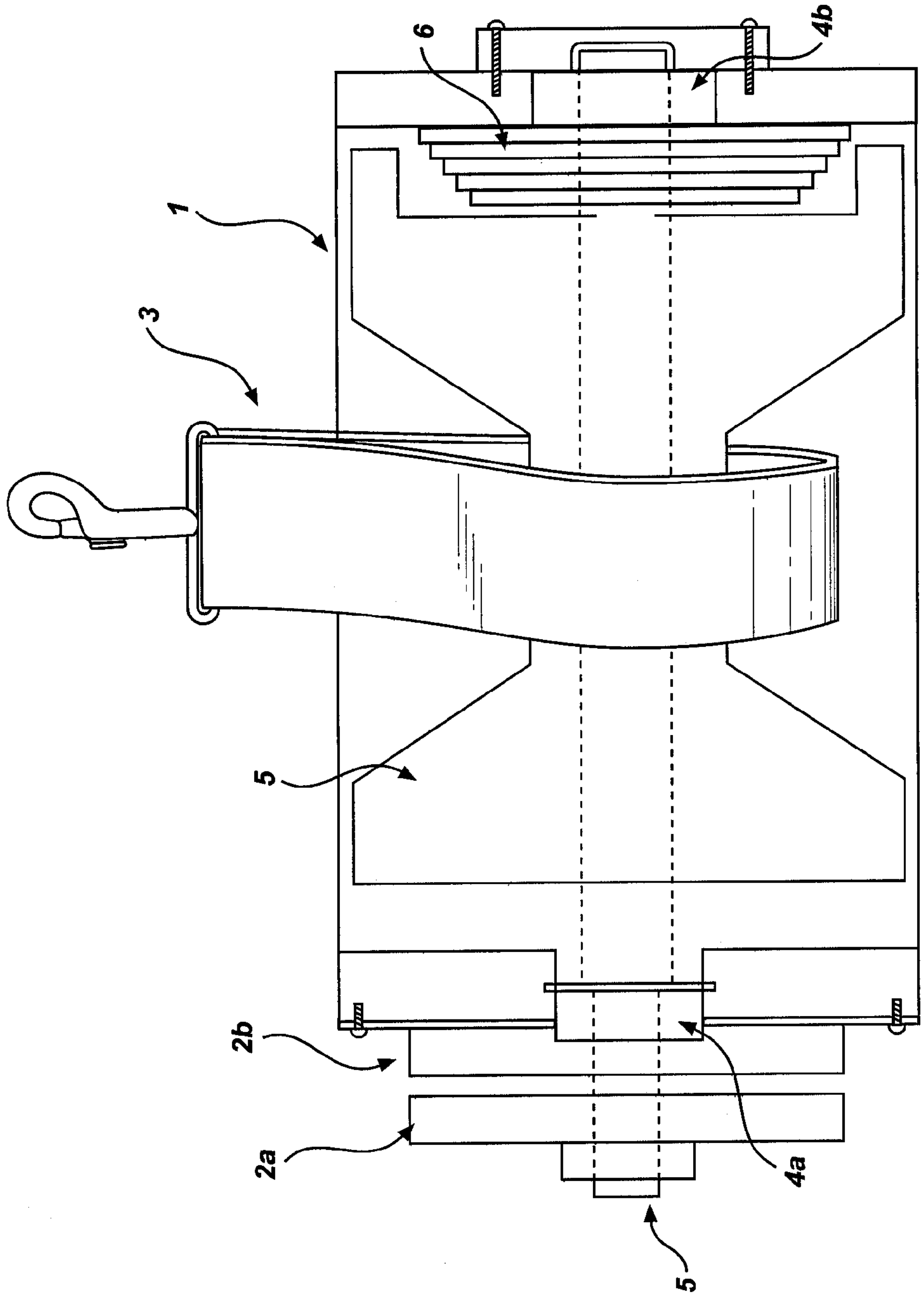
Figure 3:
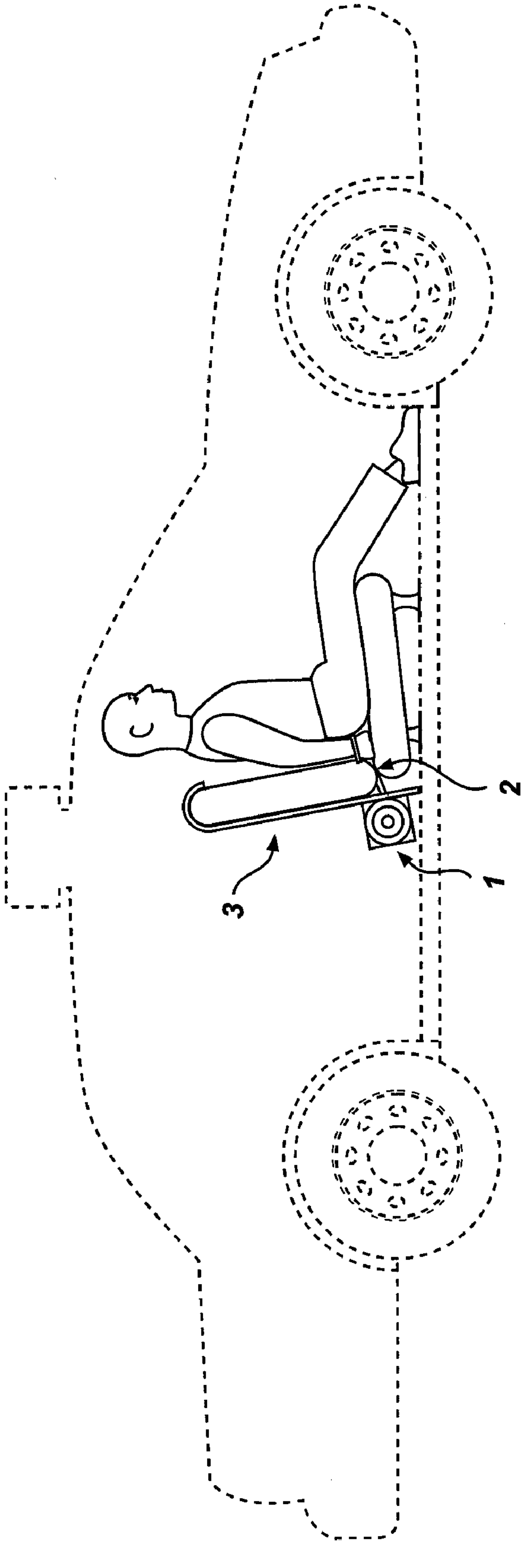

FIG. 2, is a cross section view of the device showing the inner workings and components. Again, without a mounting system FIG. 3, is a side view of a patrol car with the retractable restraint mounted to the backside of the front passenger seat. The restraint strap passes through the gap between the bottom of the seat and the seat back and attaches to the prisoner's handcuffs.

Figure 4:
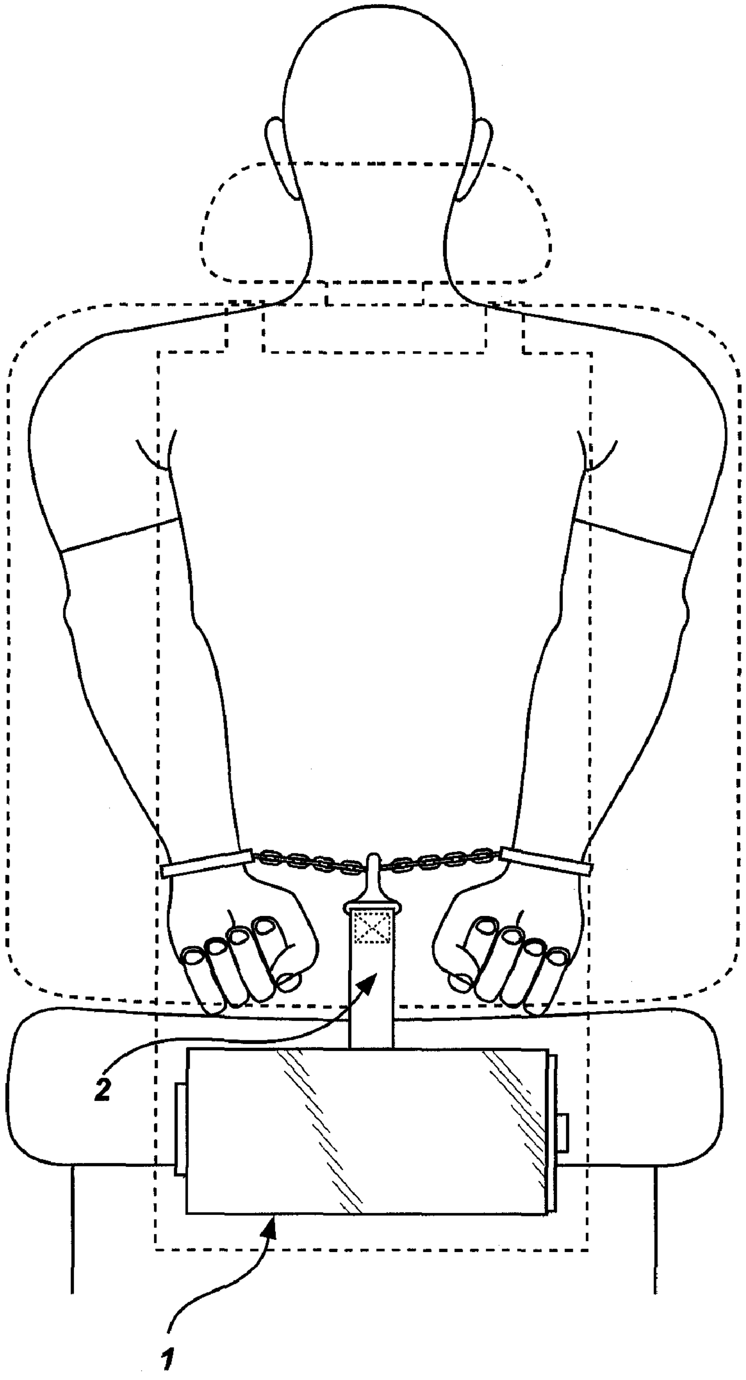

FIG. 4, is a rear view of the retractable restraint in use on the front passenger seat as shown in FIG. 3.

DETAILED DESCRIPTION OF THE INVENTION

The retractable restraint device as shown in FIG. 2 consists of a cue assembly (FIG. 2(1)); electromagnetic brake (FIG. 2(2*a, b*)); a tether in the form of a strap assembly (FIG. 2(3)); sealed bearing assemblies (FIG. 2(4*a, b*)); shaft and spool assembly (FIG. 2(5)); return spring (FIG. 2(6)); and restraint strap (FIG. 2(3)).

The free end of the restraint strap (FIG., 2(3)) is allowed to pass from the case assembly (FIG. 2(1)) through an opening cut into the case assembly (FIG. 2(1)). The free end of the restraint strap (FIG. 2(3)) is intended to have a clasp or hook to attach to the restrained prisoner's handcuffs.

The restraint strap (FIG. 2(3)) is wound on the shaft and spool assembly (FIG. 2(5)) which is kept in a state of tension by return spring (FIG. 2(6)). This provides for the retraction of the restraint strap (FIG. 2(3)) when the invention is in the inactive mode. The shaft and spool assembly rides on the two bearing assemblies (FIG. 2(4*a, b*)) to allow free movement of the shaft in either direction when the invention is in the inactive mode.

The electromagnetic brake assembly (FIG. 2(2*a, b*)) is a two-piece device consisting of an electromagnet (FIG. 2(2*b*)) that is attached to the case assembly (FIG. 2(1)). The second part of the electromagnetic brake assembly (FIG., 2(2*a*)) is attached to the shaft with a set-screw and rotates with the shaft without interference from the electromagnet (FIG. 2(2*b*)) while the invention is in the inactive mode.

When voltage is applied (active mode) to the electromagnetic brake assembly (FIG. 2(2*a, b*)), part (FIG. 2(2*b*)) produces an electromagnetic force that pulls the friction material of electromagnetic brake assembly (FIG. 2(2*a*)) into physical contact with the electromagnetic brake assembly part (FIG. 2(2*b*)). This binds the electromagnetic brake assembly (FIG. 2(2*a*)) which is attached to the shaft and spool assembly (FIG. 2(5)) to the electromagnetic brake assembly (FIG. 2(2*b*)) which is attached to the case assembly (FIG. 2(1)). This renders the shaft and spool assembly (FIG. 2(5)) locked and immoveable preventing the strap assembly (FIG. 2(3)) from being pulled out of the case assembly (FIG. 2(1)).

As shown in FIG. 3, the retractable restraint (FIG. 1(1)) is mounted to the backside of the front passenger seat. The strap assembly (FIG. 3(3)) is passed through the gap between the seat back and the seat bottom and attached to the prisoner's handcuffs.

FIG. 4 shows the same example from a rear view.

When the retractable restraint described in this invention is used to restrain a prisoner in the front seat of a law enforcement vehicle, the following procedure would be followed. The prisoner would be escorted to the open door of the vehicle. The strap assembly could either be simply lying on the seat and would need to be pulled out by the officer to hook to the handcuffs of the prisoner, or the strap assembly could be attached to the inside of the vehicle door with a hook-type device. This would allow the strap to be pulled out when opening the door allowing easy access. Since the invention is retractable, the strap would move in and out with the opening and closing of the door. In either case, the strap assembly would be attached to the handcuff of the prisoner, and the prisoner allowed to sit down in the seat. The retractable restraint would retract the excess strap as the prisoner sits down. Once the prisoner is seated, the officer would activate the retractable restraint. (This could be accomplished in any number of ways, including RF remote control, dash-mounted switch, or possibly a switch mounted on the rear of the device, out of the prisoner's reach.) Once the retractable restraint is activated, the electromagnetic brake would lock the shaft and spool assembly and the prisoner would be unable to exit the seat. Since, in most cases, the prisoner's knees would be higher in elevation than his hips, he would be at an anatomical disadvantage with respect to body leverage and would be less likely to overcome the strength of the electromagnetic brake assembly.

Upon arrival at a detention facility, the officer could remove the prisoner from the vehicle by deactivating the retractable restraint, thus freeing the shaft and spool assembly and allowing it to rotate freely. The prisoner could then exit the vehicle, pulling a length of strap assembly out as he/she stands up. The strap assembly would then be allowed to either retract back into the device, or be attached to the door as outlined above, making it ready for the next use.

By default, the retractable restraint is in an inactive state, meaning that as long as voltage is not applied to the electromagnetic brake assembly, the strap assembly is free to be pulled out of, or retract into, the device. This was a safety consideration in the design of the device. Since in the event of a mishap such as an accident, rollover or fire, power would most likely not be available to keep the device activated. A position sensor such as a mercury switch could be incorporated into the design to ensure that the device is only capable of being activated in an upright position.

The retractable restraint could be used in a variety of different applications including, but not limited to, restraining a prisoner in a courtroom, the back seat of a vehicle, or used with K9 Units.

We claim:

1. A method for restraining a person in custody, the method comprising:

- selecting a tether connected to a retraction mechanism, the tether having an attachment mechanism on a free end thereof;
- selecting a person wearing a restraint mechanism which holds the person's hands behind the person's back;
- attaching the attachment mechanism to the restraint mechanism;
- retracting the tether as the person sits in a seat; and
- locking the retraction mechanism to hold the person in the seat.

2. The method according to claim 1, further comprising unlocking the retraction mechanism to allow the tether to extend to allow the person to get out of the seat, while the person remains attached to the retraction mechanism and the tether.

3. The method according to claim 1, wherein the method comprises positioning the retraction mechanism on one side of the seat, extending the tether between portions of the seat and holding the person in the seat on a side opposite the retraction mechanism.

4. The method according to claim 1, wherein the retraction mechanism is mounted on a frame which is removably mountable on a seat of an automobile.

5. The method according to claim 4, wherein the method comprises mounting the frame on a seat such that a portion of the frame extends to the front of the seat and the retraction mechanism is disposed behind the seat and the tether extends through the seat.

6. The method according to claim 1, further comprising a release for unlocking the retraction mechanism and wherein the method comprises disposing the release away from the location of the retraction mechanism.

7. The method according to claim 1, wherein the seat has an upper portion and a lower portion and wherein the method comprises extending the tether between the upper portion and the lower portion.

8. The method according to claim 1, wherein locking the retraction mechanism comprises applying an electromagnetical brake in the retraction mechanism to prevent the tether from being pulled out of the retraction mechanism.

9. The method according to claim 1, wherein the method comprises positioning a person adjacent a vehicle, automatically retracing the tether as the person sits down in the vehicle and remotely locking the locking mechanism to hold the person in the vehicle.

10. The method according to claim 9, wherein the method further comprises, remotely unlocking the retraction mechanism, allowing the person to exit the vehicle while the person is still attached to the retraction mechanism via the tether, and releasing the person from the tether.

11. A method for restraining a person in custody, the method comprising:

selecting a tether connected to a retraction mechanism, the tether having an attachment mechanism on a free end thereof;

attaching the attachment mechanism to a person while the person is wearing a restraint which holds the person's hands behind the person's back;

retracting the tether as the person sits in a seat; and locking the retraction mechanism to hold the person in the seat;

wherein the seat is a seat in a police car, and wherein the retraction mechanism is electronically locked to hold the person in the seat of the police car.

12. A method for restraining a person in custody, the method comprising: selecting a tether connected to a retraction mechanism, the tether having an attachment mechanism on a free end thereof;

attaching the attachment mechanism to a person while the person is wearing a restraint which holds the person's hands behind the person's back;

retracting the tether as the person sits in a seat; and locking the retraction mechanism to hold the person in the seat;

wherein the method comprises attaching the strap to a person while the person is standing and automatically retracting the strap as the person sits down in a seat.

13. The method according to claim 12, wherein the method comprises attaching the attachment mechanism to a pair of hand-cuffs holding the person's hands behind the person's back so that when the retraction mechanism is locked, the person is held in the seat with his or her hands behind his or her back.

14. A method for restraining a person in custody, the method comprising:

selecting a tether connected to a retraction mechanism, the tether having an attachment mechanism on a free end thereof;

attaching the attachment mechanism to a person while the person is wearing a restraint which holds the person's hands behind the person's back;

retracting the tether as the person sits in a seat; and locking the retraction mechanism to hold the person in the seat;

wherein the method comprises releasing the tether in the event that power is turned off to the retraction mechanism.

15. A method for restraining a person comprising:

selecting a strap mounted in a vehicle having a seat;

extending the strap through a portion of the seat and attaching the strap to a person having their hands held behind their back;

automatically retracting the strap as the person sits in the seat;

electromechanically locking the strap in a retracted position to hold the person in the seat; and maintaining the strap in a retracted position until the person is authorized to get out of the vehicle;

extending the strap as the person gets out of the vehicle while the strap remains attached to the person; and releasing the strap from the person after the person has exited the vehicle.

16. A method for restraining a person comprising:

temporarily attaching a spring mounted spool to a seat in a vehicle, and passing the strap between an upper portion and a lower portion of the seat;

extending the strap and attaching the strap to the person wearing a restraint which holds the person's hands behind the person's back;

retracting the strap;

selectively locking the strap in a retracted position from a remote position; and maintaining the strap in a retracted position until the person is authorized to get out of the vehicle.

17. A method for restraining a person in custody, the method comprising:

selecting a tether connected to a retraction mechanism behind a seat in a vehicle, the tether having an attachment mechanism on a free end thereof disposed on an opposing side of the seat from the retraction mechanism, the retraction mechanism being biased to automatically retract the tether;

selecting a person being taken into custody who has been handcuffed with a pair of handcuffs so that the person's hands are held behind their back;

attaching the attachment mechanism to the handcuffs; and retracting the tether as the person sits in the seat;

locking the retraction mechanism to hold the person in the seat until the person is authorized to get out of the seat; and releasing the retraction mechanism to allow the person to get out of the seat while maintaining the person attached to the tether.

18. The method according to claim 17, wherein the method comprises positioning the tether to extend between an upper portion and lower portion of the seat.

19. A method for restraining a person comprising:

selecting a strap mounted in a vehicle having a seat with the strap being attached on a side of the seat;

extending the strap and attaching the strap to a person on the opposite side of the seat while the person's hands are held behind their back;

automatically retracting the strap as the person sits in the seat;

electromechanically locking the strap in a retracted position; and maintaining the strap in a retracted position until the person is authorized to get out of the vehicle;

wherein the method comprises using a spring biased spool to retract the strap and a remotely activated electromagnetic brake to selectively prevent the strap from being pulled away from the spring biased spool.

20. A method for restraining a person in custody, the method comprising:

selecting a tether connected to a retraction mechanism, the tether having an attachment mechanism on a free end thereof;

attaching the attachment mechanism to a person wearing a restraint which holds the person's hands behind the person's back;

retracting the tether as the person sits in a seat;

locking the retraction mechanism to hold the person in the seat;

unlocking the retraction mechanism to allow the tether to extend to allow the person to get out of the seat, while the person remains attached to the retraction mechanism and the tether.

21. A method for restraining a person in custody, the method comprising:

selecting a tether connected to a retraction mechanism that is mounted on a frame which is removably mountable on the seat of an automobile, the tether having an attachment mechanism on a free end thereof;

attaching the attachment mechanism to a person wearing a restraint which holds the person's hands behind the person's back;

retracting the tether as the person sits in a seat; and locking the retraction mechanism to hold the person in the seat.

22. The method according to claim 21, wherein the method comprises mounting the frame on a seat such that a portion of the frame extends to the front of the seat and the retraction mechanism is disposed behind the seat and the tether extends through the seat.

23. A method for restraining a person in custody, the method comprising:

selecting a tether connected to a retraction mechanism, the tether having an attachment mechanism on a free end thereof;

attaching the attachment mechanism to a person wearing restraint the person's hands behind the person's back;

retracting the tether as the person sits in a seat;

locking the retraction mechanism to hold the person in the seat;

wherein there is a release for unlocking the retraction mechanism and the release is disposed remotely from the location of the retraction mechanism.

24. A method for restraining a person in custody, the method comprising:

selecting a tether connected to a retraction mechanism, the tether having an attachment mechanism on a free end thereof;

attaching the attachment mechanism to a person wearing a restraint which holds the person's hands behind the person's back;

retracting the tether as the person sits in a seat;

locking the retraction mechanism to hold the person in the seat; and releasing the retraction mechanism once the person is authorized to get out of the seat.

25. The method according to claim 24, wherein locking and releasing the retraction mechanism is performed remotely from the tether.

26. The method according to claim 25, wherein the method comprises retracting the tether as the person sits in a seat of a vehicle and further comprises allowing the person to exit the vehicle while the person is still attached to the retraction mechanism via the tether, and releasing the person from the tether.

* * * * *